United States Patent [19]
Selwood et al.

[11] Patent Number: 5,139,888
[45] Date of Patent: Aug. 18, 1992

[54] STRUCTURES FABRICATED FROM ALUMINIUM COMPONENTS AND PROCESSES INVOLVED IN MAKING THESE STRUCTURES

[75] Inventors: Patrick G. Selwood, Deddington; Anthony Maddison, Tamworth; Peter G. Sheasby, Banbury, all of England

[73] Assignees: Alcan International Limited, Montreal, Canada; BL Technology Limited, London, England

[21] Appl. No.: 804,465

[22] Filed: Dec. 5, 1991

Related U.S. Application Data

[60] Continuation of Ser. No. 719,764, Jun. 24, 1991, which is a division of Ser. No. 369,133, Jun. 21, 1989, Pat. No. 5,026,612, which is a continuation-in-part of Ser. No. 186,666, Apr. 20, 1988, abandoned, which is a continuation of Ser. No. 607,260, May 4, 1984, abandoned.

[30] Foreign Application Priority Data

May 7, 1983 [GB] United Kingdom ................. 8312626

[51] Int. Cl.⁵ .............................................. C22F 1/04
[52] U.S. Cl. .................................................... 428/594
[58] Field of Search ...................... 428/594; 148/12 R

[56] References Cited

U.S. PATENT DOCUMENTS

| | | | |
|---|---|---|---|
| 2,773,302 | 12/1956 | Watson | 428/594 |
| 2,847,756 | 8/1958 | Sangdahl | 428/594 |
| 3,718,509 | 2/1973 | Germano | 148/6.2 |
| 3,843,417 | 10/1974 | Ohbu | 148/12 R |
| 4,202,709 | 5/1980 | Shibamori | 148/12 R |

OTHER PUBLICATIONS

Hübner et al., *Die Praxis der anodischen Oxidation des Aluminums*, 3d ed. (1977), pp. 122–123 & translation.
Wernick et al., *Die Oberflächenbehandlung von Aluminium*, (1969), pp. 196–199 & translation.

*Primary Examiner*—Peter D. Rosenberg
*Attorney, Agent, or Firm*—Cooper & Dunham

[57] ABSTRACT

A process for forming a structure of aluminium components comprises pre-treating aluminium sheet to produce an inorganic non-metallic surface coating thereon, forming the pre-treated sheet to produce components of desired shape and applying adhesive to the components and securing them together by means of the adhesive. Generally, an adhesive-compatible press lubricant is present on the sheet when it is formed. The invention also includes aluminium sheet carrying the inorganic non-metallic surface coating and a press lubricant thereon.

5 Claims, No Drawings

STRUCTURES FABRICATED FROM ALUMINIUM COMPONENTS AND PROCESSES INVOLVED IN MAKING THESE STRUCTURES

This is a continuation of application Ser. No. 719,764, filed Jun. 24, 1991, which is a division of application Ser. No. 369,133, filed Jun. 21, 1989, now U.S. Pat. No. 5,026,612, which is a continuation-in-part of application Ser. No. 186,666, filed Apr. 20, 1988 (now abandoned), which was a continuation of application Ser. No. 607,260, filed May 4, 1984 (now abandoned).

This invention relates to structures fabricated from aluminium components, and to processes involved in making these structures.

The term "aluminium" as used here and throughout the specification is intended to include aluminium alloys and in particular includes the 2000, 5000 and 6000 series of the Aluminum Association Incorporated Register.

It is well known for aluminium structures to be fabricated by spot-welding components together. However, the resulting structure is usually not suitable for carrying major structural loads.

Structures of shaped aluminium components joined by adhesive are widely used in the aircraft industry. In the aircraft industry, aluminium components to be joined to form a structure are first cut and formed to a desired shape. In order to obtain a durable bond, i.e. one that does not lose its strength with time, the aluminium component is then pre-treated. In general one of three pre-treatment processes is used. The aluminium oxide surface layer is removed using acid or alkaline solutions in all three methods. In the first method the surface is treated with chromic oxide and sulphuric acid. The second method is chromic acid anodising, and the third method is phosphoric acid anodising. The result in all three methods is a new aluminium oxide structure, but of a particular crystallographic form, particular hydration state and particular morphology. A disadvantage common to all three pre-treatment processes is that they take a relatively long time, of the order of 30-60 minutes, for the final aluminium oxide layer to build up. Great care is also taken in the aircraft industry to avoid contamination of the pre-treated surfaces, e.g. by oil, grease or water, as this is thought to prevent the formation of strong and durable bonds.

It has also been proposed for aluminium structures to be "well-bonded", that is bonded with adhesive but also spot-welded. The spot-welding is carried out through the adhesive after the structure has been assembled. The aluminium components are pre-treated by a phosphoric acid anodising process before the adhesive is applied in order to increase the durability of the bond formed.

French Patent Specification No. 2506864 describes a method of assembling and adhesively joining aluminium components for vehicle body panels. The formed components are cleaned and given a chromate treatment before adhesive is applied to them and their edges are folded over to hold them together. This type of assembly is not suitable for load bearing structural parts of a vehicle and the chromate treatment is carried out after the components have been formed.

A paper entitled "Adhesive bonding of aluminium automotive body sheet alloys" published under the number T14 in November 1975 by the Aluminum Association describes the adhesive bonding of aluminium autobody sheet alloys the surface of which has been vapour degreased and treated by a chemical conversion process.

According to a first aspect of this invention there is provided a process for forming a structure of aluminium components, which process comprises pre-treating aluminium sheet to produce an inorganic non-metallic surface coating thereon said surface coating being a chemical conversion coating or a deposited coating of the no-rinse type, forming the pre-treated sheet to produce components of desired shapes, applying adhesive to the components and securing the components together by means of the adhesive.

According to a second aspect of this invention there is provided aluminium sheet at least 0.7 mm thick suitable for forming a structure of formed aluminium components secured together by adhesive, which sheet carries an inorganic non-metallic surface coating of between 0.01 to 1.5 $g/m^2$ thereon said surface coating being a chemical conversion coating or a deposited coating of the no-rinse type, and an adhesive-compatible press lubricant on the surface coating.

Preferred features of this invention will be apparent from the subsidiary claims of the specification.

A coil of aluminium sheet is regarded as comprising a sheet of indefinite length. The sheet is usually coiled for convenience of storage and transport and is, of course, uncoiled for the pre-treatment process. In order for the pre-treatment to be continuous, the back end of one coil may be joined to the front end of the following coil. After pre-treatment, the sheet is re-coiled or cut into sheets of discrete lengths again for convenience of storage and transport.

Alternatively, the pre-treatment process can be carried out on the aluminium sheet after it has been cut into discrete lengths. In this case, the sheets may be immersed in a pre-treatment solution in batches.

It has been discovered that bonds or structures formed according to this invention may be very durable and that the structures can be strong enough to form the load bearing structure of a motor vehicle. The pre-treatment process used to form the surface layer may be carried out much quicker than many of those used in the prior art. It has also been discovered that the pre-treated sheet can be cut and formed without causing substantial damage to the pre-treated surface layer, even when the forming of the sheet involves pressing it between dies, so the layer is still able to provide a base for strong and durable adhesive bonds. Because of this, an uncoiled aluminium sheet can be pre-treated before being cut into discrete lengths so the pre-treatment process can be carried out continuously and can be carefully controlled.

Although it is not essential that the entire surfaces of the components to be joined are pre-treated, it will generally be found convenient for this to be so. Similarly, although it is possible for the spot-welds to be carried out at locations where there is no adhesive, it will generally be found desirable to spot-weld at a position where there is adhesive, the spot-welding being carried out through the adhesive before it has set.

As mentioned above, the components may be formed into the desired shapes from sheet which has already been pre-treated. This makes it much easier to carry out the pre-treatment process when a large number of components are involved. Press lubricant may be applied to an uncoiled pre-treated sheet whilst it is still in a continuous form or after it has been cut into discrete lengths. With a suitable selection of press lubricant applied in an appropriate quantity, it has been found that any lubricant remaining on the sheet after forming need not be removed as it has little effect upon the durability and strength of the bonds subsequently formed.

The surface layer may be produced as a chemical conversion coating or as a deposited coating of the so-called no-rinse type.

Advantageously, the coating weight of the surface layer is at least 0.01 g/m$^2$. The coating weight is advantageously less than 1.5 g/m$^2$, preferably between 0.02 and 0.7 g/m$^2$, and most preferably between 0.05 and 0.3 g/m$^2$.

With conversion coatings, the pre-treatment process is preferably carried out at a temperature between 10° and 50° C. The aluminium surface is preferably cleaned, and possibly etched, to remove aluminium oxide before the surface layer is formed. An acid cleaner is preferably used with magnesium containing alloys to ensure removal of magnesium oxide from the surface of the metal. The surface layer may be formed in 10–120 seconds depending on the thickness produced and the temperature, a higher temperature promoting faster formation of the coating.

The surface layer may contain between 5% and 60% by weight of chromium, preferably at least 10%, and most preferably between 10% and 50%. It may be desirable for the surface layer to contain at least 20% by weight of chromium.

The surface layer may contain at least 15% of phosphate by weight, preferably between 20% and 40%. It may be desirable for the surface layer to contain at least 30% of phosphate by weight.

Advantageously, the ratio by weight of chromium to phosphate lies between 3:5 and 5:3.

The surface layer may contain between 30% and 95% by weight of hydrated chromium phosphate, and preferably between 40% and 60%.

The surface layer may contain hydrated chromium oxide ($Cr_2O_3$): with a phosphate conversion coating, the surface layer may contain between 5% and 40% by weight of chromium oxide; with a no-phosphate conversion coating, it may contain between 70% and 95% by weight of chromium oxide; and in the case of a no-rinse coating the surface layer may contain between 30% and 60% by weight of chromium oxide.

The concentration of the different elements in the surface layer varies with the depth in the layer, generally being higher nearer to the surface of the layer, but the figures for the elements and compounds given relate to percentage by weight for the bulk of the layer.

The surface layer may contain no more than 10% of aluminium by weight, preferably no more than 6%, and less than 10% of fluorine by weight, preferably less than 6%. The percentage by weight of aluminium and fluorine also vary with depth in the layer and the highest concentration is at the aluminium/surface layer interface.

The surface layer may be applied by spraying the aluminium or by immersing it in a pre-treatment solution. Alternatively, the aluminium may be roller-coated with a pre-treatment solution. Advantageously, the pre-treatment solution contains chromium and phosphate and/or fluoride ions. In the pre-treatment process described below it is believed that the chromium may be in a hexavalent form in the solution and is reduced to the trivalent state in forming a surface layer. The chromium ions could for example be supplied from chromium trioxide ($CrO_3$) or sodium dichromate ($Na_2Cr_2O_7$); the phosphate ions could be supplied by orthophosphoric acid ($H_3PO_4$); and the fluoride ions could be supplied by hydrofluoric acid (HF).

Advantageously, prior to application of the pre-treatment solution, the aluminium is subjected to a cleaning stage, which may either simply degrease the surface to remove debris which has accumulated thereon, or remove the normal air formed aluminium oxide layer, which may typically be 50–300 Å thick, and etch the aluminium surface.

The untreated aluminium alloy may contain elements other than those referred to above such as magnesium, copper and silicon but these usually account for less than 10% or less than 5% by weight of the alloy. These elements can also be present in small quantities in the surface layer. Other trace elements may also be present in both the aluminium alloy and the surface layer.

The surface layer produced should allow the components to be joined by resistance spot-welding and with given limits it has been found that spot-welds can easily be formed through the surface layer. No significant increase in the electrical resistance of the surface layer during storage of the pre-treated coils or cut sheets has been noted.

Preferred structures according to this invention and processes involved in making the structures will now be described merely by way of example.

A coil of aluminium 0.7 to 2.0 mm thick is first of all cleaned in an organic vapour (such as trichlorethylene) or in an alkaline solution, rinsed by watersprays, and then treated with an acid or alkaline solution to remove the aluminium oxide layer which forms on aluminium which has been exposed to the air. The sheet is then rinsed again.

The aluminium is then sprayed with or immersed in a solution containing chromium, phosphate and fluoride ions until the desired coating weight for the surface layer is achieved. A surface layer weight of 0.3–0.4 g/m$^2$ gives a coating about 0.1 microns thick. Although the coating weight can be up to 1.5 g/m$^2$, which gives a thickness of about 0.4–0.5 microns, a thick surface layer is disadvantageous since it tends to crack or craze when the sheet is press-formed and its increased electrical resistance can make spot-welding difficult.

The preferred range of coating weight for ease of spot-welding is 0.1–0.5 g/m$^2$. After being pre-treated, the aluminium is rinsed and dried and then re-coiled or cut into discrete lengths. The sheet may be dried after the rinsing step by a warm air flow at about 50°–60° C. As will be discussed in more detail later, it has been found that the pre-treated aluminium coil or cut sheets can be stored for up to 6 months without any significant deterioration in the pre-treated surface layer. The pre-treated surface layer is thus capable of providing a sound base for a strong and durable adhesive bond even if it has been stored for a considerable time between pre-treatment and the application of adhesive.

The storage stability of the pre-treated aluminium is surprising as the application of prior art surface layers has always been immediately followed by the application of an organic coating such as paint or lacquer. No such coatings are applied to the processes described herein, the sheet being stored having only the pre-treated surface layer and no other surface layer thereon or only the pre-treated surface layer and a coating of press lubricant. The storage stability of the pre-treated aluminium enables it to be stored before it is subsequently formed into components of a structure. In practice, this is essential as there is often a delay of at least 48 hours and usually more than 168 hours (one week) between the pre-treatment of the aluminium at one site, e.g. at an aluminium mill, and the forming of the aluminium into components of desired shape at another site, e.g. in a vehicle production line.

The pre-treated aluminium is coated with an oil, grease or water based press lubricant. The lubricant should be chosen in relation to the adhesive so that it does not unduly affect bond durability and strength. After the sheet has been cut it is formed by pressing between dies to produce components of a desired shape from which the resulting structure is to be built up. The press lubricant may be applied immediately after the pre-treatment and before the sheet is re-coiled or cut into discrete lengths. Alternatively, if the pre-treated sheet is re-coiled the press-lubricant may be applied after the coil is un-coiled again and before it is subsequently cut into discrete lengths. It is also possible to apply the press lubricant after the sheet has been cut into discrete lengths. The lubricant is preferably sprayed onto the aluminium but may be applied by roller-coating or other suitable means. As little lubricant as is necessary for satisfactory forming is used and it is normally applied at a rate of less than 20 g/m$^2$ and is preferably applied at a rate of less than 5 g/m$^2$. The lubricant is preferably applied by machine as this gives a uniform coating on the aluminium. The lubricant is preferably applied before the coil or sheets are stored since the presence of lubricant enhances the durability of the pre-treated surface layer.

The formed components are then coated with an epoxide adhesive and assembled together in a jig. Spot-welds are then formed while the adhesive is still fluid, and these then hold the structure together without jigging while the adhesive cures. The adhesive is usually cured for 10 to 30 minutes at a temperature of 150° to 180° C. Phenolic or acrylic adhesives may be used in place of the epoxide adhesive. Toughened adhesives such as epoxide with a dispersed rubber or similar phase may also be used. The adhesive may also contain between 5% and 70% by weight of aluminium powder.

The adhesive used in the joints should be capable of retaining its strength under a wide variety of conditions such as temperature and humidity. The adhesive should wet the surface it is applied to but preferably be such that it does not sag or drip when applied to a vertical surface. Thixotropic materials may thus be preferred. The adhesive may be applied by any suitable method and may be applied to form a layer from about 0.1 to 3.0 mm thick in the final joint depending on joint geometry. The adhesive is preferably sufficiently fluid to be squeezed out of the way at locations in the joint where pressure is applied by a spot-welding tool.

It has been found that a structure formed in the manner described above is strong enough to be load bearing and has durable bonds which substantially retain their strength with time. It will be appreciated that besides holding the structure together when it is removed from the jig, the spot-welds also increase the strength of the joint between the bonded components and in particular increase the peel strength of the joint.

Of course many variations in the structure and method described above are possible. In particular, the pre-treating solution need not contain any phosphate.

Also, pre-treatments can be used which do not produce a conversion coating but instead produce a pre-treated surface layer on top of the aluminium oxide surface layer existing on the sheet. This type of pre-treatment is usually known as a "no-rinse" pre-treatment, and is often roller applied.

The aluminium sheet used is preferably between 0.7 and 4.0 mm thick.

Detailed examples of three preferred processes will now be described.

EXAMPLE 1

Conversion Coating

In the first process an aluminium alloy (e.g. 5251 alloy) which contains about 2% by weight of magnesium, in sheet form was subjected to a cleaning stage, rinsed, and subjected to an acid bath to remove the aluminium and magnesium oxides and to etch the aluminium surface. After a rinsing stage, the sheet was immersed in a solution containing 49,500 ppm (parts per million) of phosphate (measured as $PO_4$) by weight, 16,500 ppm hexavalent chromium (measured as $CrO_3$) by weight and 1,200 ppm of fluoride (measured as F) by weight. The solution was at room temperature, i.e. about 20° to 25° C. The sheet was subjected to the solution for about 120 seconds until a coating weight of 0.5 g/m$^2$ was formed.

The treated aluminium surface contained $Cr^{3+}$, $Al^{3+}$, $O^{2-}$, $F^-$ and $PO_4^{3-}$ ions. The $Cr^{3+}:PO_4^{3-}$ weight ratio was approximately 1.4:1. It was found by measurement that the surface coating as a whole included about 29.6% by weight of chromium, about 20.8% by weight of phosphate and about 8.3% by weight of aluminium. Of course the concentrations of the ions varies according to the depth in the coating. Assuming the following hydration states, the coating was found to consist of $CrPO_4.4H_2O$ (48% by weight); $Cr_2O_3.2H_2O$ (33% by weight); $AlF_3$ (2% by weight); $AlO.OH$ (17% by weight). The ratio of chromium phosphate to chromium oxide in the surface layer has been found to vary with treatment conditions. Examples of pre-treatment solutions of the type described above are Bonderite 705 (Trade Mark) produced by Pyrene Chemical Services Limited, and Alodine 407/47 (Trade Mark) produced by I.C.I. p.l.c.

As an alternative, a chromate conversion coating can be formed which contains no phosphate. In this case the pre-treatment solution contains chromates and fluorides and an accelerator and the coating formed is believed to consist mainly of chromium oxide $Cr_2O_3.2H_2O$ with some aluminium fluoride ($AlF_3$) and hydrated aluminium oxide. Such a coating may contain about 50% by weight of chromium. An example of this type of pre-treatment solution is Alodine 1200E (Trade Mark) produced by I.C.I. p.l.c.

The aluminium sheet was then cut, lubricated and pressed to form various components, of desired shapes. Adhesive was next applied between the pre-treated surfaces of components to be secured together before they were placed in a jig. An epoxide adhesive, such as that produced by the 3M company under the Trade Mark EC2214 or that produced by Permabond Inc under the Trade Mark ESP105, containing 50% by weight of aluminium powder was used. It was not found necessary to remove any press lubricant remaining on the formed components prior to application of the adhesive. Indeed, the complete removal of lubricant prior to application of the adhesive would be impracticable in a mass production line.

The press lubricant may by pushed aside by the subsequently applied adhesive but may also become dispersed within the adhesive. The press lubricant should therefore be comptabile with the pre-treated aluminium and with the adhesive. The press lubricant should also be capable of ready removal prior to any painting operation even after being subjected to any elevated temperature at which adhesive has been cured. The press lubricant Houghtodraw 7002 (Trade Mark) made by Edgar Vaughan Limited has been found to be suitable. A light oil such as dioctyl sebacate used prior to coiling aluminium strip is not suitable as a press lubricant.

Resistance spot-welding was carried out through the adhesive whilst this was still in paste form using 5 mm truncated cone electrodes. An electrode pressure of 500 pounds (2.2 KN) was held for a time equal to 10 cycles of the electrical welding power prior to a 3 cycle weld at 23,000 amps, and was followed by a holding time of 10 cycles to allow the molten slug of aluminium produced to solidify. Adjacent welds were spaced about 6 inches to 1 foot (15 to 30 cms) apart.

The adhesive was cured by placing the structure in an oven at 180° C. for 30 minutes. The resulting structure had environmentally stable structural bonds.

In order to assess bond durability of such structures and to compare with known processes, the above procedure was repeated for pairs of test strips of aluminium alloy (5251 alloy) which were cleaned and coated as described in Example 1, overlapped at the ends, and glued with an epoxide adhesive but without being spot-welded. The epoxide adhesive was cured for 30 minutes at 180° C. Two groups of such bond samples were produced. The shear strength of the bond was tested using the perforated lap shear method in which the two strips are longitudinally pulled apart from each other. This measurement was done on one group of samples when the adhesive had set (to give the zero time strength), and on the other after an exposure to neutral salt spray for eight weeks at 43° C.

The same procedure was repeated for 2117 alloy (which contains about 2% by weight of copper) and 6009 alloy (which contains small mounts of magnesium, silicon and copper). In each case, an acid bath (A) was used in the cleaning stage.

The procedure was then repeated for each of the three types of alloy with the acid bath (A) cleaning stage being replaced by an alkaline etching cleaner (B), then with the acid bath (A) cleaning stage being replaced by an alkaline etching cleaning and de-smut stage (C) (a de-smut stage removes intermetallic components), and finally with the acid bath (A) cleaning stage being replaced by a non-etching alkaline cleaner (D), which merely removes surface contaminants and not the oxide layer.

As a comparison, similar strips of 2117 alloy were coated with the Boeing Aircraft Corporation 5555 pre-treatment (a phosphoric acid anodising process), glued with the same adhesive, and subjected to the perforated lap shear test. The results obtained are given in Table 1.

The results showed that the shear strengths and the durability of the samples did not differ significantly between different pre-treatment processes for any particular alloy and that, for the 2117 alloy, three of the pre-treatment processes (A, B and C) compared favourably with the Boeing process.

TABLE 1

STRENGTH AND DURABILITY TESTS WITH CHROMATE/PHOSPHATE CONVERSION COATING

SHEAR STRENGTH

| | Zero Time | 8 Weeks Salt Spray Exposure | |
|---|---|---|---|
| | | MN/m$^2$ | % ZTS |
| 2117 Alloy (1.6 mm) guage | | | |
| BAC 5555 | 18.11 ± 0.99 | 10.50 ± 0.90 | 58% |
| Pre-Treatment CSA | 14.70 ± 0.79 | 10.03 ± 1.06 | 68% |
| Pre-Treatment CSB | 14.46 ± 0.52 | 9.71 ± 0.36 | 67% |
| Pre-Treatment CSC | 14.18 ± 1.43 | 9.37 ± 2.00 | 66% |
| Pre-Treatment CSD | 14.31 ± 0.52 | 7.21 ± 2.26 | 50% |
| 5251 ALLOY (1.6 mm) guage | | | |
| Pre-Treatment CSA | 16.82 ± 0.63 | 10.36 ± 0.57 | 62% |
| Pre-Treatment CSB | 16.20 ± 0.85 | 9.27 ± 0.90 | 57% |
| Pre-Treatment CSC | 15.88 ± 1.08 | 9.39 ± 0.25 | 59% |
| Pre-Treatment CSD | 15.74 ± 0.68 | 8.92 ± 0.88 | 57% |
| 6009 ALLOY (1.0 mm) guage | | | |
| Pre-Treatment CSA | 14.72 ± 1.85 | 9.86 ± 0.64 | 67% |
| Pre-Treatment CSB | 15.24 ± 0.77 | 10.12 ± 1.41 | 66% |
| Pre-Treatment CSC | 14.36 ± 1.34 | 9.25 ± 0.60 | 64% |
| Pre-Treatment CSD | 15.92 ± 0.63 | 10.35 ± 1.40 | 65% |

CS = Cleaning Stage
ZTS = Zero Time Strength

Experiments were then done on samples pre-treated in the manner described above and then spot-welded. The spot welds did not impair the strengths of the bonds. It will be appreciated that it is not possible to spot-weld through the BAC 5555 pre-treatment as this process produces a relatively thick surface layer. In addition, it should be noted that the build up of the final surface layer takes about 30 minutes at 25° C. with the BAC 5555 process and less than 1 minute with the coating concentrate described above and that no anodising is carried out in the process described above.

EXAMPLE 2

No-Rinse Coating

In the second preferred process an aluminium alloy (e.g. 5251 alloy) sheet is cleaned and rinsed as in the first process. A pre-treatment concentrate comprising approximately equal quantities by weight of partially reduced chromic acid (that is, chromic acid in which some of the hexavalent chromium is partially reduced to trivalent chromium) and finely divided silica, is diluted appropriately with water and is roller-coated onto the aluminium. The preparation of such a pre-treatment concentrate is described in U.S. Pat. No. 3,706,603. An example of a pre-treatment concentrate of this type is Accomet C (Trade Mark) produced by Albright and Wilson Limited. This is preferably diluted with water to give a pre-treatment solution between 1% and 30%, preferably between 4% and 15%, by volume of Accomet C. No rinsing step is required after the application of the pre-treatment solution. The coating is then dried by warm air to leave a coating of about 0.1–0.2 g/m$^2$ on top of the normal air formed aluminium oxide layer.

Press lubricant was then applied onto the pre-treated surface layer and the sheet re-coiled or cut into discrete lengths for storage.

In contrast to Example 1, this pre-treatment does not produce a conversion coating as it does not react to any significant extent with the oxide layer on the aluminium. The surface layer produced thus lies on top of the oxide layer. The surface layer produced also contains no phosphate. The surface layer produced is believed to consist mainly of the fine silica particles coated with chromium oxide ($Cr_2O_3$). It is estimated that the surface layer contains about 25% by weight of chromium. The process is known as a "no-rinse" pre-treatment as the aluminium is not rinsed after the pre-treatment solution has been applied. The pre-treatment solution can, of course, be applied by spraying or by any other suitable method.

stretched or compressed and examined and then bonded together and tested for bond strength and durability. The examination of the formed strips showed at worst only slight cracking of the pre-treated layer. The results of the tests conducted are given in Table 3 together with the results for similar tests on undeformed strips for comparison. As will be seen, the initial bond strength of the formed strip was 5–10% less than that of the unformed strips but no further detrimental effect on bond durability was found.

TABLE 3

EFFECT OF FORMING AFTER PRE-TREATMENT AND BEFORE BONDING

| Pre-treatment | | Mode of deformation | Initial bond strength $MN/m^2$ | Salt Spray Testing Time | | | | | | | |
|---|---|---|---|---|---|---|---|---|---|---|---|
| | | | | 1 | | 2 | | 4 | | 8 | |
| | | | | bond strength | % strength retention | bond strength | % strength retention | bond strength | % strength retention | bond strength | % strength retention |
| Chromate/ Phosphate Conversion coating | 0.1 g/m² | A | 18.6 | 14.9 | 80.2 | 13.6 | 72.8 | 13.2 | 70.6 | 11.2 | 60.4 |
| | | B | 18.8 | 14.8 | 78.3 | 13.4 | 71.0 | 12.6 | 66.7 | 11.6 | 61.4 |
| | 0.5 g/m² | A | 17.8 | 15.4 | 86.4 | 13.4 | 75.1 | 12.8 | 66.2 | 11.3 | 63.4 |
| | | B | 17.6 | 14.7 | 84.0 | 13.0 | 74.0 | 12.2 | 69.5 | 11.2 | 63.9 |
| No-rinse coating | | A | 19.1 | 17.0 | 86.6 | 13.7 | 71.6 | 13.1 | 68.7 | 12.1 | 63.6 |
| | | B | 19.9 | 15.5 | 77.8 | 13.7 | 69.2 | 11.6 | 58.4 | 11.5 | 58.0 |
| Chromate/ Phosphate Conversion coating | 0.1 g/m² | unformed control | 20.1 | 18.9 | 94.2 | 16.1 | 80.2 | 15.1 | 75.3 | 14.7 | 73.2 |
| | 0.5 g/m² | unformed control | 19.8 | 18.5 | 93.0 | 16.4 | 82.3 | 14.5 | 73.2 | 13.7 | 68.9 |

A = Stretched condition
B = Compressed condition

Tests were made to compare the bond strength and durability of joints formed according to Examples 1 and 2 and the results are shown in Table 2. It will be seen that the different types of pre-treatment produce similar results.

TABLE 2

COMPARISON OF PRE-TREATMENTS ACCORDING TO EXAMPLES 1 AND 2

| Pre-treatment | Initial bond strength (MPa) | salt spray testing % strength retention after (weeks) | | |
|---|---|---|---|---|
| | | 2 | 8 | 20 |
| Chromate/Phosphate conversion coating at weight of 0.5 g/m² | 21.5 | 86.6 | 76.4 | 63.5 |
| No-rinse coating | 20.2 | 95.6 | 96.1 | 71.9 |

It is found that a satisfactory pre-treatment coating can be formed on the aluminium alloys of the 5000 and 6000 series under a wide range of conditions but that tighter control over conditions is required to form satisfactory coatings on alloys of the 2000 series. Particular care is required with such copper containing alloys.

As mentioned above, it is surprising that the forming of the aluminium sheet does not cause substantial damage to the pre-treated layer. To study this test strips of aluminium which has been pre-treated were biaxially Tests were also conducted to determine the bond strength between strips having pre-treated surface layers of different thickness. The results of these tests are given in Table 4. It will be seen that the bond strength and durability is similar for all the coating weights tested between 0.1 and 0.5 g/m² although the thinner surface layers tend to produce joints slightly less durable than the thicker surface layers.

Storage trials, in which pre-treated aluminium was kept in selected environments for periods of up to 6 months, were carried out, and bonds then made, and salt spray tested.

The storage condition used were as follows:
(1) Office conditions (O.D.) (dry and relatively warm).
(2) Exposure in a deep shelter (C.W.) (cold and relatively humid).

The results are given in Table 5. Again, it will be seen that the different types of pre-treatment give similar results, each pre-treatment producing a durable joint.

TABLE 4

EFFECT OF COATING WEIGHT WITH CHROMATE-PHOSPHATE CONVERSION COATING

| Pre-treatment Coating Weight | Initial bond strength $MN/m^2$ | Salt Spray Testing Time | | | | | | | |
|---|---|---|---|---|---|---|---|---|---|
| | | 1 | | 2 | | 4 | | 8 | |
| | | bond strength | % strength retention | bond strength | % strength retention | bond strength | % strength retention | bond strength | % strength retention |
| 0.1 g/m² | 19.4 | 16.7 | 85.8 | 17.3 | 89.0 | 12.8 | 65.8 | 11.6 | 59.9 |
| 0.3 g/m² | 19.5 | 17.6 | 90.3 | 15.8 | 81.1 | 12.9 | 66.4 | 11.0 | 56.5 |
| 0.5 g/m² | 21.0 | 16.2 | 76.8 | 16.7 | 79.6 | 14.2 | 67.8 | 10.4 | 49.6 |
| 0.7 g/m² | 19.3 | 16.2 | 83.5 | 16.4 | 84.6 | 13.8 | 71.3 | 11.6 | 60.1 |

This invention also relates to a structure as described above which forms part of a motor vehicle. Accelerated tests indicate that such structures are capable of retaining adequate strength under the wide variety of conditions that a motor vehicle generally encounters for a time at least equal to the useful service life of the vehicle.

TABLE 5

STRENGTH AND DURABILITY TESTS AFTER STORAGE OF THE PRE-TREATED SHEET

| Pre-treatment | Storage condition | Initial bond strength (MPa) | Salt spray testing % strength retention after (weeks) | |
|---|---|---|---|---|
| | | | 2 | 8 |
| Chromate/ | OD | 21.3 | 84.0 | 71.3 |
| Phosphate conversion at weight of 0.5 g/m² | CW | 22.8 | 70.6 | 64.0 |
| No-rinse coating | OD | 20.3 | 83.2 | 69.0 |
| | CW | 20.7 | 69.9 | 65.2 |

EXAMPLE 3

This Example describes experimental work carried out to investigate the effect of metal deformation (by stretching) on pretreated aluminium sheet (using both chromium- and non-chromium-based pretreatments) on strength and durability properties of adhesively bonded joints comprising the pretreated metal.

Experimental procedures, materials and results sections are shown below under the following headings:
 (i) Metal
 (ii) Pretreatment
 (iii) Deformation
 (iv) Lap Joints
 (v) Durability
 (vi) Joint Strength
 (vii) Results
 (viii) Discussion

(i) Metal

The material used throughout was 5251 alloy aluminium alloy sheet (containing approximately 2% magnesium) in the annealed condition and with a thickness gauge of 2 mm.

(ii) Pretreatment

Pretreatments, as described below were carried out on suitable sizes of the metal. Vapour degreasing (trichlorethylene) and acid etching (Ridolene 124/120E) treatment was used prior to coating the material in one or other of the following:

1. ALODINE 4830/4831 in the proportion 15 ml:12.5 ml per litre of final solution to produce a zirconium based conversion coating. These pretreatment systems are commercially available. The metal was immersed in the above solution at 35° C. for 60 seconds, drained and then dried at 100° C. for 180 seconds.

2. ALBRITECT in a solution supplied by the manufacturers. This is a commercially available chromium-free phosphate-based pretreatment system for aluminium. The metal was roller coated to give a "no-rinse" coating. This was dried at 180° C. for 3 minutes.

3. ACCOMET C. This is a commercial chromium based "no-rinse" process. Coating was done by roller coating using a 50% solution. The coated metal was dried off at 180° C. for 3 minutes duration.

(iii) Deformation

After pretreatment, the metal was divided into 2 parts.
(a) Some metal was stretched to give a 10% elongation.
(b) The remaining metal was kept unstretched.

Metal of adherend size (20 mm exactly × 90 mm approximately) was then cut from the metal from (a) and (b).

(iv) Lap Joints

A small amount of a commercial adhesive (single part epoxy type), into which was mixed glass spheres of 250 micron diameter, was smeared onto the tips of the adherend metal to cover 10 mm from one edge. Pairs of adherends with the same pretreatment were made into single lap joints with a 10 mm overlap using a suitable jig arrangement, a small clip being used to keep the parts in contact. After removing excess adhesive from the edge and fillet regions, the jig containing the joints was placed in an oven at 180° C. for 30 minutes to effect adhesive cure.

After curing, the joint edges were lightly filed to remove excess cured adhesive, except in the fillet regions.

Three holes, each 4 mm in diameter were drilled across the centre line of the overlap regions, in order to accelerate deterioration in the durability test (neutral salt spray) carried out subsequently. Drilling was also carried out on joints not subjected to neutral salt spray.

(v) Durability

Triplicate jointed specimens, as described in (iii), made from adherends given each of the three pretreatments, which had been stretched, and triplicate corresponding specimens which had not been stretched were subjected to neutral salt spray.

The conditions used were as follows:
Spray solution: sodium chloride (5%)
Spray collection rate: 1.5 ml±0.5 ml/h over 8000 mm²
Spray temperature: 43° C.
Specimen position: vertical
Test period: 8 weeks continuous spray.

At the end of the test period, the specimens were removed, rinsed and tested for residual lap shear strength in comparison with others not subjected to neutral salt spray.

(vi) Joint Strength

The above mentioned joints were pulled apart using an Instron testing machine at a strain rate of 2 mm/minute. The maximum loads were recorded and the average breaking stresses were calculated (ignoring the areas of the drilled holes).

A measure of the durability of the joints in salt spray is shown by comparing the strength of the joints subjected to salt spray with those not given that treatment (residual strength %).

(vii) Results

The results of the above tests are given in the table below:

PRETREATMENT-EFFECT OF STRETCHING OF PRETREATED METAL PRIOR TO JOINTING ON JOINT STRENGTH AND DURABILITY

| | | | Joint Strength/Weeks in Salt Spray | | | | | |
|---|---|---|---|---|---|---|---|---|
| | | | 0 | | | 8 | | |
| NT. No. | Pretreatment | Stretch % | Load (KN) | Average Stress (MPa) | Residual Strength (%) | Load (KN) | Average Stress (MPa) | Residual Strength (%) |
| 606 | ALODINE 4830 | 10 | 4.435<br>4.440<br>4.950 | 23.125 | 100 | 3.105<br>3.120<br>3.420 | 16.075 | 69.5 |
| 607 | ALBRITECT | 10 | 4.600<br>4.480<br>4.780 | 23.100 | 100 | 2.750<br>2.820<br>2.990 | 14.267 | 61.8 |
| 608 | ACCOMET C | 10 | 4.630<br>4.725<br>4.730 | 23.475 | 100 | 3.<br>3.335<br>3.505 | 16.900 | 72.0 |
| 609 | ALODINE 4830 | 0 | 4.305<br>3.785<br>4.070 | 20.267 | 100 | 2.730<br>3.150<br>2.995 | 14.792 | 73.0 |
| 610 | ALBRITECT | 0 | 3.750<br>3.890<br>4.000 | 19.400 | 100 | 2.530<br>2.031<br>2.395 | 11.593 | 59.8 |
| 611 | ACCOMET C | 0 | 3.955<br>3.845<br>3.980 | 19.717 | 100 | 3.475<br>3.440<br>3.315 | 17.050 | 86.5 |

(viii) Discussion

The lap shear strength of joints made from stretched metal is similar irrespective of the pretreatment given. Where unstretched pretreatments are used, the joint strengths are noticeably lower. This is consistent with the understanding that joint strength is enhanced by increasing the mechanical properties of the metal, as would occur with stretching.

The durability of the joints is clearly shown by these results. Joints made from non-chromium pretreatments have deteriorated at a similar rate (for each type) for both stretched and unstretched versions.

With joints made from chromium based solution (Accomet C), stretching has had a greater effect. Although the breaking stresses are similar for both stretched and unstretched versions, the rate of deterioration after 8 weeks salt spray is greater with the stretched version due to its higher initial strength.

The results can be compared to those in Table 3 above where the no-rinse coating used was in fact Accomet C.

We claim:

1. Aluminium sheet at least 0.7 mm thick suitable for forming a structure of formed aluminium components secured together by adhesive, which sheet carries an inorganic non-metallic surface coating of between 0.01 to 1.5 g/m² thereon said surface coating being a chemical conversion coating or a deposited coating of the no-rinse type, and an adhesive-compatible press lubricant on the surface coating.

2. Aluminium sheet as claimed in claim 1, wherein the surface coating contains at least 10% by weight of chromium.

3. Aluminium sheet as claimed in claim 1, wherein the sheet is from 0.7 to 2 mm thick.

4. An aluminium sheet as claimed in claim 1, wherein the sheet is in coil form.

5. An aluminium sheet as claimed in claim 1, wherein the press lubricant is compatible with epoxy adhesive.

* * * * *